(12) United States Patent
Zhou et al.

(10) Patent No.: US 12,297,900 B2
(45) Date of Patent: May 13, 2025

(54) LUBRICATING MECHANISM FOR PLANETARY GEAR TRAIN

(71) Applicants: ZF WIND POWER (TIANJIN) CO., LTD., Tianjin (CN); ZF Wind Power Antwerpen N.V., Lommel (BE)

(72) Inventors: Dan Zhou, Tianjin (CN); Guowei Niu, Tianjin (CN)

(73) Assignees: ZF WIND POWER (TIANJIN) CO., LTD., Tianjin (CN); ZF Wind Power Antwerpen, N.V., Lommel (BE)

(*) Notice: Subject to any disclaimer, the term of this patent is extended or adjusted under 35 U.S.C. 154(b) by 0 days.

(21) Appl. No.: 18/859,175

(22) PCT Filed: Mar. 21, 2023

(86) PCT No.: PCT/CN2023/082840
§ 371 (c)(1),
(2) Date: Oct. 23, 2024

(87) PCT Pub. No.: WO2023/207434
PCT Pub. Date: Nov. 2, 2023

(65) Prior Publication Data
US 2025/0109787 A1   Apr. 3, 2025

(30) Foreign Application Priority Data

Apr. 24, 2022 (CN) .......................... 202210458645.4

(51) Int. Cl.
*F16H 57/04* (2010.01)

(52) U.S. Cl.
CPC ....... *F16H 57/0479* (2013.01); *F16H 57/043* (2013.01); *F16H 57/0471* (2013.01)

(58) Field of Classification Search
CPC . F16H 57/0479; F16H 57/043; F16H 57/0471
See application file for complete search history.

(56) References Cited

U.S. PATENT DOCUMENTS

| 3,399,370 A | * | 8/1968 | Mack | F16J 15/3224 |
| | | | | 439/23 |
| 3,610,711 A | * | 10/1971 | Mierley, Sr. | F16C 33/74 |
| | | | | 277/422 |

(Continued)

FOREIGN PATENT DOCUMENTS

| CN | 201560902 U | 8/2010 |
| CN | 109667918 A | 4/2019 |

(Continued)

*Primary Examiner* — Colby M Hansen
(74) *Attorney, Agent, or Firm* — Leydig, Voit & Mayer, Ltd.

(57) ABSTRACT

A lubricating mechanism for a planetary gear train, including a planetary gear, a sliding bearing, a planetary gear shaft, and a thrust bearing. The thrust bearing is arranged at an end surface of the planetary gear. A gap is formed between the thrust bearing and end surface. An axial and radial channel are formed in the thrust bearing in a lubricating position in a circumferential direction. The thrust bearing includes a groove facing the end surface. A seal is provided in the groove. One end of the axial channel is in communication with the gap, the other end being in communication with the radial channel and being an open end leading to an outside of the planetary gear train. The axial channel is closer to the sliding bearing than the groove in a radial direction. The seal is configured to prevent lubricating oil from being discharged from the gap.

20 Claims, 5 Drawing Sheets

(56) References Cited

U.S. PATENT DOCUMENTS

| | | | | | |
|---|---|---|---|---|---|
| 3,746,407 | A | * | 7/1973 | Stiles | F16C 33/107 |
| | | | | | 310/90.5 |
| 4,200,345 | A | * | 4/1980 | Walker | F16C 33/78 |
| | | | | | 384/150 |
| 4,268,040 | A | * | 5/1981 | Bainard | F16J 15/3268 |
| | | | | | 277/572 |
| 4,593,774 | A | * | 6/1986 | Lingafelter | F16J 15/006 |
| | | | | | 175/320 |
| 4,596,054 | A | * | 6/1986 | MacKendrick | F16C 33/7853 |
| | | | | | 277/362 |
| 4,753,303 | A | * | 6/1988 | Burr | F16J 15/344 |
| | | | | | 175/359 |
| 4,899,605 | A | * | 2/1990 | Tanaka | F02N 15/046 |
| | | | | | 475/331 |
| 5,178,471 | A | | 1/1993 | Roessler et al. | |
| 5,456,476 | A | * | 10/1995 | Premiski | F16H 57/0479 |
| | | | | | 475/159 |

FOREIGN PATENT DOCUMENTS

| | | |
|---|---|---|
| CN | 214331182 U | 10/2021 |
| EP | 3290725 A1 | 3/2018 |

\* cited by examiner

LUBRICATING MECHANISM FOR PLANETARY GEAR TRAIN

CROSS REFERENCE TO RELATED APPLICATIONS

This application is a U.S. National Phase application under 35 U.S.C. § 371 of International Application No. PCT/CN2023/082840, filed on Mar. 21, 2023, and claims benefit to Chinese Patent Application No. CN 202210458645.4, filed on Apr. 24, 2022. The International Application was published in Chinese on Nov. 2, 2023 as WO 2023/207434 A1 under PCT Article 21(2).

FIELD

The present invention relates to a lubricating mechanism and a lubricating mechanism capable of establishing a desired oil pressure.

BACKGROUND

Figure 1:
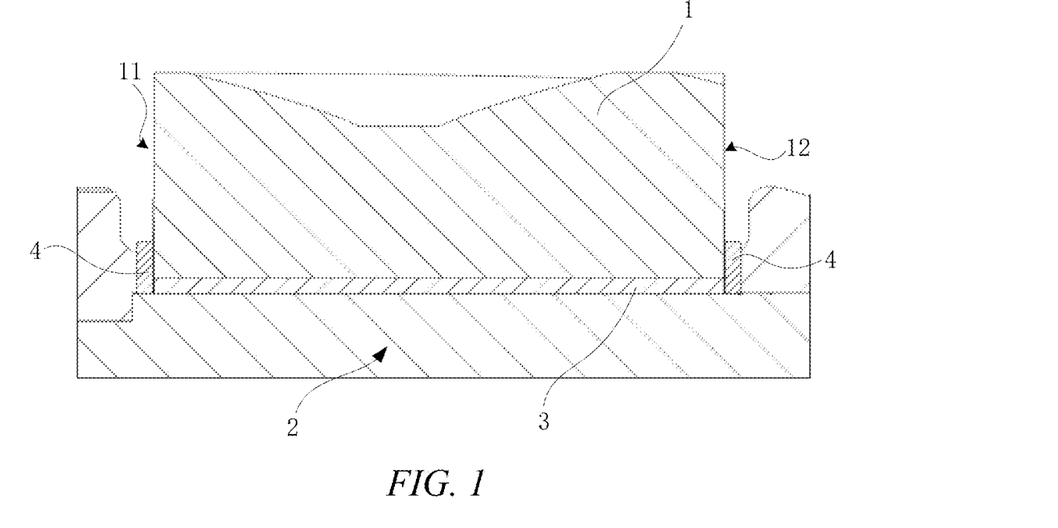
FIG. 1 shows a schematic diagram of the assembly of a planetary gear and a planetary gear shaft of a gearbox in the prior art.

Wind turbine gearboxes are an important component of wind turbine systems for efficient power generation. Taking a gearbox which adopts a planetary system as an example, a planetary gear is supported on a planetary gear shaft by means of a bearing. Referring to FIG. 1, a planetary gear 1 is supported on a planetary gear shaft 2 by means of a sliding bearing 3 (a floating sliding bearing is used as an example in FIG. 1, and a fixed sliding bearing is also applicable). In order to limit an axial displacement, thrust bearings 4 are generally provided at two end surfaces 11, 12 of the planetary gear 1.

Figure 2:
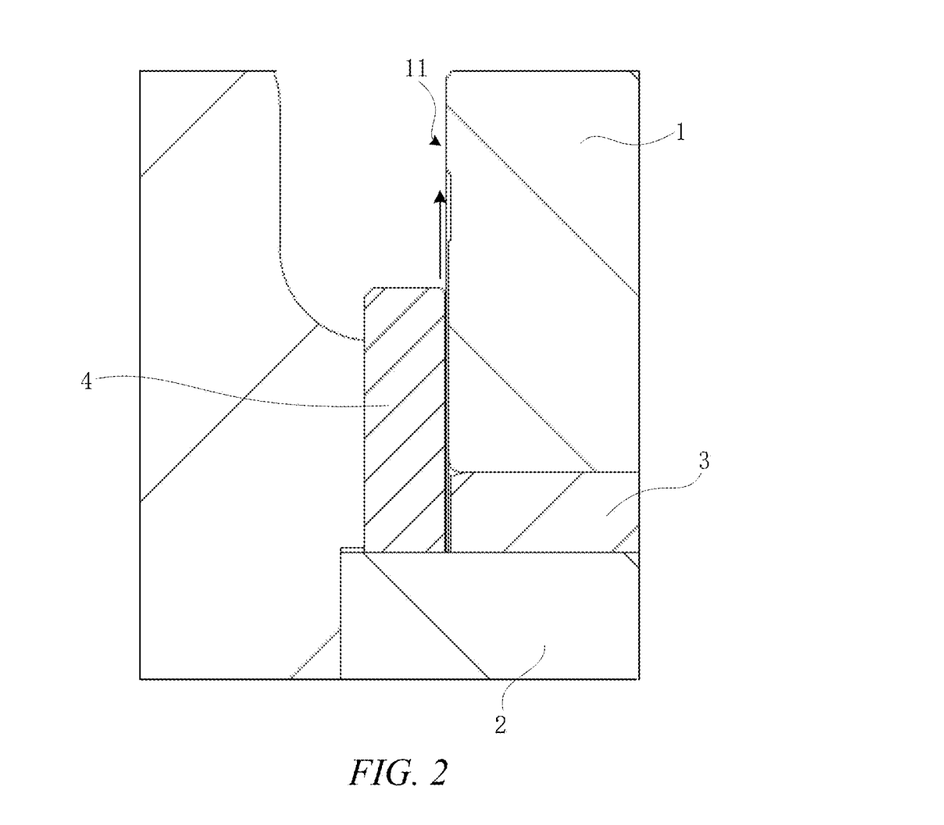
FIG. 2 shows a schematic diagram of a positional relationship of a thrust bearing at a left end surface of the planetary gear and a sliding bearing of FIG. 1.

Referring primarily to FIG. 2, taking a left end surface 11 of the planetary gear 1 as an example, due to a gap between the thrust bearing 4 and the sliding bearing 3, lubricating oil will flow out of the gap (in the direction of the arrow). In other words, it is difficult to establish a desired oil pressure at the end surface of the planetary gear due to the presence of the gap, and the lower oil pressure is detrimental to the lubrication of the sliding bearing 3. In such a design, the working environment of the sliding bearing is not desired.

SUMMARY

In an embodiment, the present disclosure provides a lubricating mechanism for a planetary gear train, the planetary gear train comprising a planetary gear, a sliding bearing, a planetary gear shaft, and a thrust bearing. The planetary gear is supported on the planetary gear shaft by the sliding bearing. The thrust bearing is arranged at an end surface of the planetary gear, and a gap is formed between the thrust bearing and the end surface of the planetary gear. An axial channel and a radial channel are formed in the thrust bearing in at least one lubricating position in a circumferential direction of the thrust bearing. The thrust bearing is provided with a groove facing the end surface of the planetary gear. A seal is provided in the groove. One end of the axial channel is in communication with the gap, the other end of the axial channel is in communication with the radial channel, and the other end of the radial channel is an open end leading to an outside of the planetary gear train. The axial channel is closer to the sliding bearing than the groove in a radial direction, and the seal is configured to prevent lubricating oil from being discharged from the gap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a lubricating mechanism for a planetary gear train that can establish a desired oil pressure, in order to solve the defects in the prior art that there is a gap between a thrust bearing and a sliding bearing in a gearbox, it is difficult to form a desired oil pressure, and it is detrimental to the lubrication of the sliding bearing.

The advantages of the present disclosure are realized by the following technical solutions.

A lubricating mechanism for a planetary gear train, the planetary gear train comprising a planetary gear, a sliding bearing, a planetary gear shaft and a thrust bearing, the planetary gear being supported on the planetary gear shaft by means of the sliding bearing, the thrust bearing being arranged at an end surface of the planetary gear, and a gap being formed between the thrust bearing and the end surface of the planetary gear, wherein an axial channel and a radial channel are formed in the thrust bearing in at least one lubricating position in a circumferential direction of the thrust bearing, the thrust bearing is provided with a groove facing the end surface of the planetary gear, a seal is provided in the groove, one end of the axial channel is in communication with the gap, the other end of the axial channel is in communication with the radial channel, and the other end of the radial channel is an open end leading to the outside of the planetary gear train, wherein the axial channel is closer to the sliding bearing than the groove in a radial direction, and the seal is configured to prevent lubricating oil from being discharged from the gap.

By providing an oil passage in the thrust bearing, it becomes difficult for the lubricating oil to be discharged, thereby improving the lubricating effect of the sliding bearing.

Preferably, at least two axial channels and at least two radial channels are formed in the thrust bearing for each lubricating position, wherein one of the axial channels that is in communication with the gap is closer to the sliding bearing than the groove in the radial direction, and the axial channels and the radial channels are alternately connected end to end. The combination of a plurality of axial channels and a plurality of radial channels is used to establish an oil pressure and slow the discharge of the lubricating oil.

Preferably, a pressure valve is provided at the open end.

Preferably, the pressure valve is a fixed-pressure pressure valve or a pressure-adjustable pressure valve.

Preferably, the pressure valves are unevenly distributed in the circumferential direction of the thrust bearing.

Preferably, the lubricating mechanism further comprises an oil inlet for the lubricating oil and a check valve arranged at the oil inlet.

Preferably, the lubricating positions are unevenly distributed in the circumferential direction of the thrust bearing.

Preferably, the seal is a contact seal or a non-contact seal.

Preferably, the thrust bearing is provided with at least one convex ring facing the end surface of the planetary gear, the convex rings being arranged at intervals in a radial direction; the end surface of the planetary gear facing the thrust bearing is provided with grooves corresponding to the convex rings on a one-to-one basis, each groove being configured to accommodate a corresponding convex ring; and an axial clearance and a radial clearance are formed between an outer surface of each convex ring and an inner surface of the groove opposite the convex ring, wherein the axial clearance and the radial clearance are in communication with the gap.

Preferably, the shortest distance between two adjacent convex rings is the same as or different from the shortest distance between two other adjacent convex rings. By setting the distance between two adjacent convex rings reasonably, axial oil passages (formed by the axial clearances) of different lengths are obtained, and the established oil pressure is adjusted accordingly.

Preferably, the convex ring has a coefficient of thermal expansion greater than that of the sliding bearing or than that of the planetary gear.

Preferably, in the radial direction, the shortest distance between two adjacent convex rings close to the sliding bearing is greater than the shortest distance between two adjacent convex rings away from the sliding bearing. That is, the convex rings are arranged more densely away from the sliding bearing, preventing the rapid discharge of the lubricating oil.

Preferably, the convex ring is closer to the sliding bearing than the seal in the radial direction.

Preferably, the end surface of the planetary gear facing the thrust bearing is provided with at least one convex ring, the convex rings being arranged at intervals in a radial direction; the thrust bearing is provided with grooves facing the end surface of the planetary gear and corresponding to the convex rings on a one-to-one basis, each groove being configured to accommodate a corresponding convex ring; and an axial clearance and a radial clearance are formed between an outer surface of each convex ring and an inner surface of the groove opposite the convex ring, wherein the axial clearance and the radial clearance are in communication with the gap.

Preferably, the shortest distance between two adjacent convex rings is the same as or different from the shortest distance between two other adjacent convex rings. By setting the distance between two adjacent convex rings reasonably, axial oil passages (formed by the axial clearances) of different lengths are obtained, and the established oil pressure is adjusted accordingly.

Preferably, the convex ring has a coefficient of thermal expansion greater than that of the sliding bearing or than that of the planetary gear.

Preferably, in the radial direction, the shortest distance between two adjacent convex rings close to the sliding bearing is greater than the shortest distance between two adjacent convex rings away from the sliding bearing.

Preferably, the convex ring is closer to the sliding bearing than the seal in the radial direction.

Preferably, the thrust bearing is provided with at least one first groove facing the end surface of the planetary gear, the first grooves being arranged at intervals in a radial direction; the end surface of the planetary gear facing the thrust bearing is provided with second grooves corresponding to the first grooves on a one-to-one basis; an accommodating space is formed by each first groove and a corresponding second groove; a barrier is provided in each accommodating space; and an axial clearance and a radial clearance are formed between an inner surface of each accommodating space and an outer surface of the barrier accommodated in the accommodating space, wherein the axial clearance and the radial clearance are in communication with the gap.

Preferably, the shortest distance between two adjacent accommodating spaces is the same as or different from the shortest distance between two other adjacent accommodating spaces.

Preferably, the barrier has a coefficient of thermal expansion greater than that of the sliding bearing or than that of the planetary gear.

Preferably, in the radial direction, the shortest distance between two adjacent accommodating spaces close to the sliding bearing is greater than the shortest distance between two adjacent accommodating spaces away from the sliding bearing.

Preferably, the barrier is closer to the sliding bearing than the seal in the radial direction.

The technical effects obtained by embodiments of the present invention are as follows.

1. By providing the radial and axial channels in the thrust bearing, a path for lubricating oil is made tortuous and an appropriate oil pressure is more easily established at the gap, thereby preventing the lubricating oil from being rapidly discharged from the gap, such that there is always a sufficient amount of lubricating oil at the sliding bearing, ensuring a lubricating effect of the sliding bearing.
2. The pressure at the open end is adjusted by the pressure valve provided at the open end, so that the desired oil pressure is established, ensuring the lubricating effect of the sliding bearing.
3. By forming the axial and radial clearances between the seal and the axial channel that is in communication with the gap, the lubricating oil is more easily confined inside the planetary gear train, thereby ensuring the lubricating effect.

The specific implementations of embodiments of the present invention will be further described below with reference to the accompanying drawings.

Figure 3:
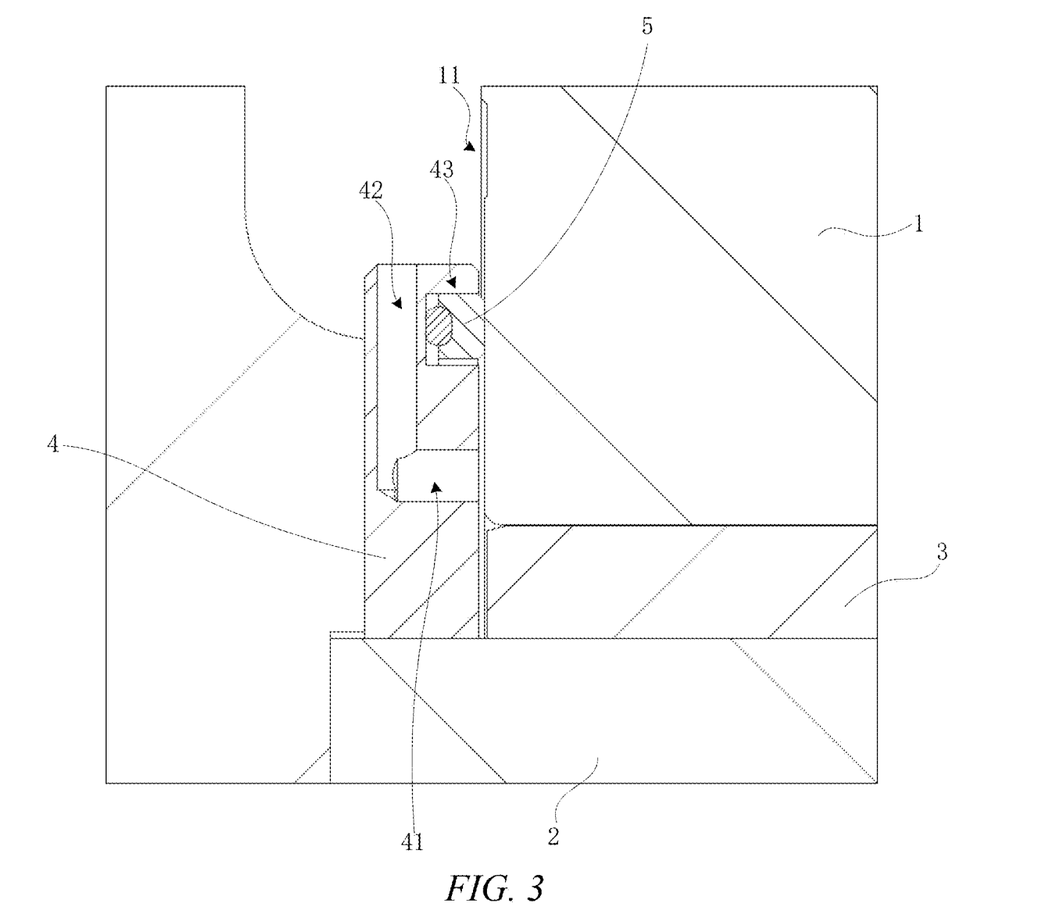
FIG. 3 is a schematic diagram of a lubricating mechanism of a planetary gear train according to a first embodiment of the present invention.
Figure 4:
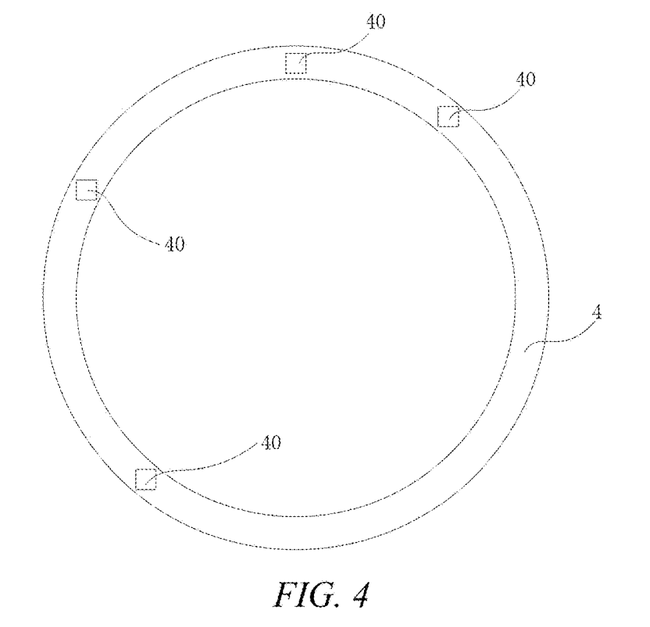
FIG. 4 is a schematic diagram of a circumferential arrangement of lubricating positions according to a first embodiment of the present invention.

Referring to FIGS. 3-4, a lubricating mechanism of a planetary gear train according to a first embodiment of the present invention is described. The planetary gear train comprises a planetary gear 1, a sliding bearing 3, a planetary gear shaft 2 and a thrust bearing 4. The planetary gear 1 is supported on the planetary gear shaft 2 by means of the sliding bearing 3, the thrust bearing 4 is arranged at an end surface of the planetary gear 1 (a left end surface 11 is shown), and a gap is formed between the thrust bearing 4 and the end surface 11 of the planetary gear 1.

Taking the left end surface 11 of the planetary gear 1 as an example, the lubricating mechanism further comprises: an axial channel 41 and a radial channel 42 formed in the thrust bearing 4 in at least one lubricating position 40 in a circumferential direction of the thrust bearing 4. The thrust bearing 4 is provided with a groove 43 facing the end surface of the planetary gear 1, a seal 5 is provided in the groove 43, one end of the axial channel 41 is in communication with the gap, the other end of the axial channel 41 is in communication with the radial channel 42, and the other end of the radial channel 42 is an open end leading to the outside of the planetary gear train. The axial channel 41 is closer to the sliding bearing 3 than the groove 43 in a radial direction, and the seal 5 is configured to prevent lubricating oil from being discharged from the gap. The lubricating positions are unevenly distributed in the circumferential direction of the thrust bearing 4.

In this design, the lubricating oil mainly used for the sliding bearing 3 enters the gap, is blocked by the seal 5, and can flow only through the axial channel 41 and the radial channel 42, so that compared to the original design, the lubricating oil cannot be rapidly discharged from the gap, thereby ensuring the lubricating effect of the sliding bearing 3.

The seal 5 is a contact seal or a non-contact seal. The seal 5 may be implemented by a single sealing element or by a plurality of sealing elements.

Referring to FIG. 4, in this embodiment, the lubricating mechanism is provided at each of four lubricating positions 40 in the circumferential direction. At least two axial channels 41 and at least two radial channels 42 are formed in the thrust bearing 4 for each lubricating position 40. One of the axial channels 41 that is in communication with the gap is closer to the sliding bearing 3 than the groove 43 in the radial direction, and the axial channels 41 and the radial channels 42 are alternately connected end to end. A serpentine oil passage is formed by connecting a plurality of axial channels and radial channels end to end, which facilitates the establishment of oil pressure, thereby ensuring sufficient lubrication of the sliding bearing 3.

Figure 5:
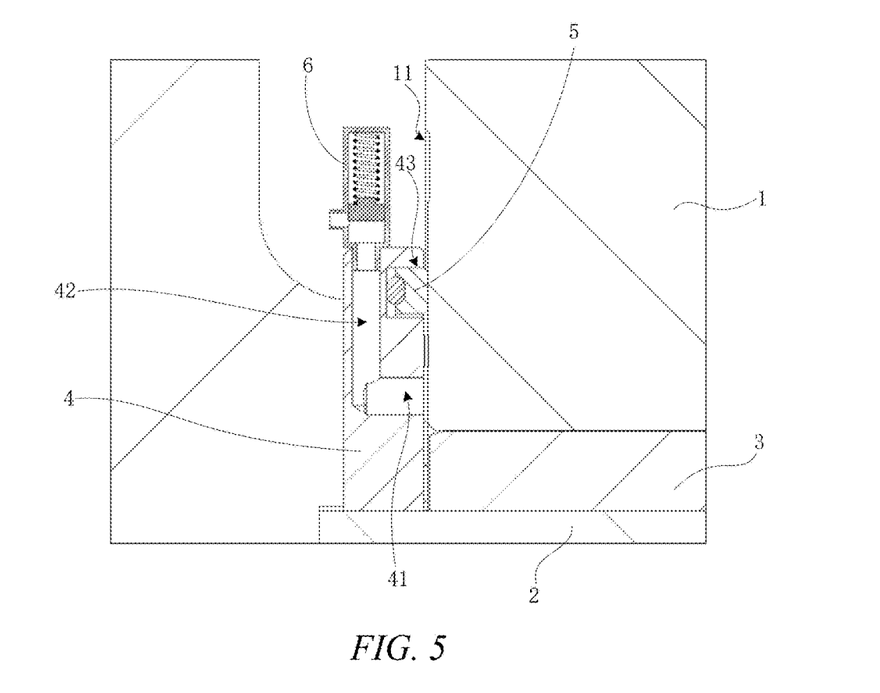
FIG. 5 is a schematic diagram of a lubricating mechanism of a planetary gear train according to a second embodiment of the present invention.

Referring to FIG. 5, to further control the oil pressure, a pressure valve 6 is provided at the open end (an upper end of the radial channel 42). Depending on actual use conditions, the pressure valve may be a fixed-pressure pressure valve or a pressure-adjustable pressure valve. Since the oil pressure of the lubricating oil may have different requirements in different lubricating positions 40 in the circumferential direction of the thrust bearing 4, the pressure valves are unevenly distributed in the circumferential direction to meet the requirements of the oil pressure in different positions.

In order to ensure that the oil pressure is better established, the lubricating mechanism further comprises an oil inlet for the lubricating oil and a check valve arranged at the oil inlet. The provision of the check valve ensures that the lubricating oil will not flow back from the oil inlet, facilitating the establishment of the oil pressure.

Figure 6:
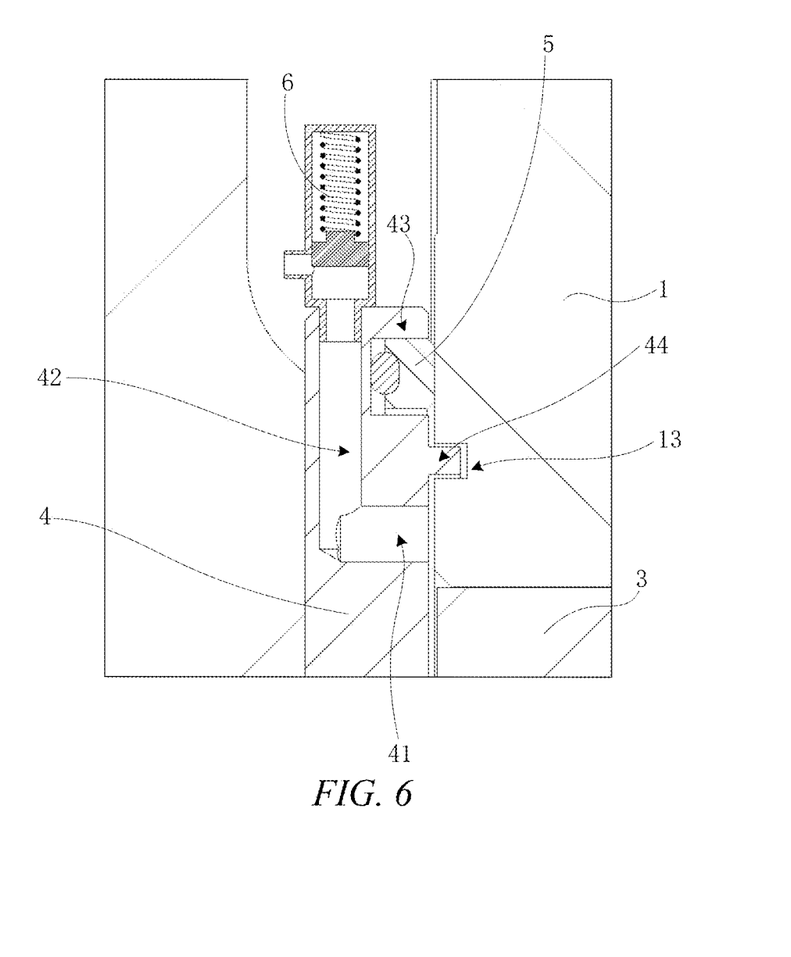
FIG. 6 is a schematic diagram of a lubricating mechanism of a planetary gear train according to a third embodiment of the present invention.

Referring to FIG. 6, in order to assist in the establishment of the oil pressure, on the basis of the embodiment shown in FIG. 5, the thrust bearing 4 is provided with at least one convex ring 44 (one is shown in FIG. 6) facing the end surface of the planetary gear 1. The convex rings 44 are arranged at intervals in a radial direction. The end surface of the planetary gear 1 facing the thrust bearing 4 is provided with grooves 13 corresponding to the convex rings 44 on a one-to-one basis. Each groove 13 is configured to accommodate a corresponding convex ring 44. An axial clearance and a radial clearance are formed between an outer surface of each convex ring 44 and an inner surface of the groove 13 opposite the convex ring 44. The axial clearance and the radial clearance are in communication with the gap. The presence of the axial and radial clearances can prevent the flow of the lubricating oil from the gap, and even if the sealing effect of the seal 5 decreases, the leakage of the lubricating oil from the gap can also be reduced due to the presence of the axial and radial clearances.

The convex ring 44 has a coefficient of thermal expansion greater than that of the sliding bearing 3 or than that of the planetary gear 1, thereby adjusting the size of the axial clearance and of the radial clearance to slow the flow of the lubricating oil. Where a plurality of convex rings are provided, in the radial direction, the shortest distance between two adjacent convex rings 44 close to the sliding bearing is greater than the shortest distance between two adjacent convex rings 44 away from the sliding bearing; and the convex ring 44 is closer to the sliding bearing than the seal 5 in the radial direction, thereby further ensuring the establishment of the oil pressure.

Of course, the convex ring may be provided on the end surface of the planetary gear 1 facing the thrust bearing 4, and the corresponding groove may be provided on an end surface of the thrust bearing.

Figure 7:
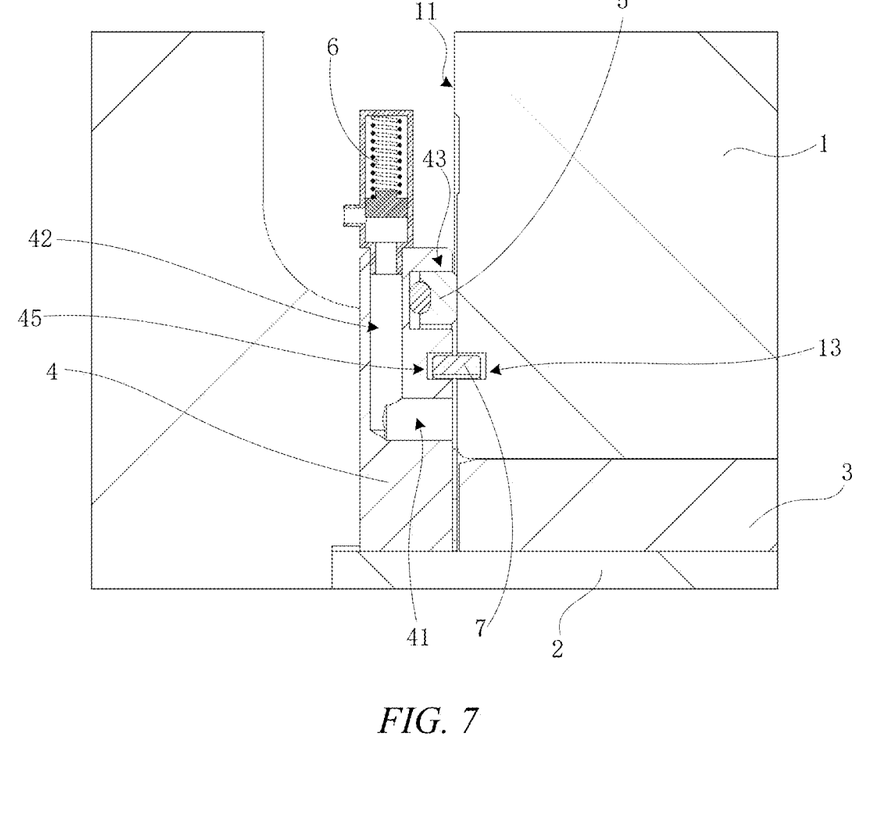
FIG. 7 is a schematic diagram of a lubricating mechanism of a planetary gear train according to a fourth embodiment of the present invention.

Referring next to FIG. 7, on the basis of the embodiment shown in FIG. 5, the thrust bearing 4 is provided with at least one first groove 45 facing the end surface of the planetary gear 1. The first grooves 45 are arranged at intervals in a radial direction. The end surface of the planetary gear 1 facing the thrust bearing 4 is provided with second grooves 13 corresponding to the first grooves 45 on a one-to-one basis. An accommodating space is formed by each first groove 45 and a corresponding second groove 13. A barrier 7 is provided in each accommodating space. An axial clearance and a radial clearance are formed between an inner surface of each accommodating space and an outer surface of the barrier 7 accommodated in the accommodating space. The axial clearance and the radial clearance are in communication with the gap. The barrier 7 is closer to the sliding bearing than the seal 5 in the radial direction.

By optimizing the shape of the oil passage extending radially from the sliding bearing to the planetary gear, embodiments of the present invention slow the discharge of the lubricating oil. In addition, by providing the pressure valve, the oil pressure of the lubricating oil is controlled, ensuring that the sliding bearing always has sufficient lubricating oil to achieve adequate lubrication.

Although the specific implementations of the present disclosure are described above, it should be appreciated by those skilled in the art that these are merely illustrative. Various changes or modifications to these implementations may be made by those skilled in the art without departing from the principle and spirit of the present invention, and these changes or modifications fall within the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lubricating mechanism for a planetary gear train, the planetary gear train comprising:
   a planetary gear;
   a sliding bearing;
   a planetary gear shaft; and
   a thrust bearing,
   the planetary gear being supported on the planetary gear shaft by the sliding bearing,
   the thrust bearing being arranged at an end surface of the planetary gear, and a gap being formed between the thrust bearing and the end surface of the planetary gear,
   wherein an axial channel and a radial channel are formed in the thrust bearing in at least one lubricating position in a circumferential direction of the thrust bearing,
   wherein the thrust bearing is provided with a groove facing the end surface of the planetary gear,
   wherein a seal is provided in the groove,
   wherein one end of the axial channel is in communication with the gap, the other end of the axial channel is in communication with the radial channel, and the other end of the radial channel is an open end leading to an outside of the planetary gear train, and
   wherein the axial channel is closer to the sliding bearing than the groove in a radial direction, and the seal is configured to prevent lubricating oil from being discharged from the gap.

2. The lubricating mechanism of claim 1, wherein at least two axial channels and at least two radial channels are formed in the thrust bearing for each lubricating position,
   wherein one of the axial channels that is in communication with the gap is closer to the sliding bearing than the groove in the radial direction, and the axial channels and the radial channels are alternately connected end to end.

3. The lubricating mechanism of claim 1, wherein a pressure valve is provided at the open end.

4. The lubricating mechanism of claim 3, wherein the pressure valve is a fixed-pressure pressure valve or a pressure-adjustable pressure valve.

5. The lubricating mechanism of claim 3, wherein pressure valves are unevenly distributed in the circumferential direction of the thrust bearing.

6. The lubricating mechanism of claim 3, wherein the lubricating mechanism further comprises an oil inlet for the lubricating oil and a check valve arranged at the oil inlet.

7. The lubricating mechanism of claim 1, wherein the lubricating positions are unevenly distributed in the circumferential direction of the thrust bearing.

8. The lubricating mechanism of claim 1, wherein the seal is a contact seal or a non-contact seal.

9. The lubricating mechanism of claim 1, wherein the thrust bearing is provided with at least one convex ring facing the end surface of the planetary gear, the convex rings being arranged at intervals in a radial direction;
   wherein the end surface of the planetary gear facing the thrust bearing is provided with grooves corresponding to the convex rings on a one-to-one basis, each groove being configured to accommodate a corresponding convex ring,
   wherein an axial clearance and a radial clearance are formed between an outer surface of each convex ring and an inner surface of the groove opposite the convex ring, and
   wherein the axial clearance and the radial clearance are in communication with the gap.

10. The lubricating mechanism of claim 9, wherein the convex ring has a coefficient of thermal expansion greater than a coefficient of thermal expansion of the sliding bearing or than a coefficient of thermal expansion of the planetary gear.

11. The lubricating mechanism of claim 9, wherein in the radial direction, a shortest distance between two adjacent convex rings close to the sliding bearing is greater than a shortest distance between two adjacent convex rings away from the sliding bearing.

12. The lubricating mechanism of claim 9, wherein the convex ring is closer to the sliding bearing than the seal in the radial direction.

13. The lubricating mechanism of claim 1, wherein the end surface of the planetary gear facing the thrust bearing is provided with at least one convex ring, each convex rings being arranged at intervals in a radial direction;
   the thrust bearing is provided with grooves facing the end surface of the planetary gear and corresponding to the convex rings on a one-to-one basis, each groove being configured to accommodate a corresponding convex ring; and
   an axial clearance and a radial clearance are formed between an outer surface of each convex ring and an inner surface of the groove opposite the convex ring,
   wherein the axial clearance and the radial clearance are in communication with the gap.

14. The lubricating mechanism of claim 13, wherein the convex ring has a coefficient of thermal expansion greater than a coefficient of thermal expansion of the sliding bearing or than a coefficient of thermal expansion of the planetary gear.

15. The lubricating mechanism of claim 13, wherein in the radial direction, a shortest distance between two adjacent convex rings close to the sliding bearing is greater than a shortest distance between two adjacent convex rings away from the sliding bearing.

16. The lubricating mechanism of claim 13, wherein the convex ring is closer to the sliding bearing than the seal in the radial direction.

17. The lubricating mechanism of claim 1, wherein the thrust bearing is provided with at least one first groove facing the end surface of the planetary gear, each first grooves being arranged at an intervals in the radial direction;
   wherein the end surface of the planetary gear facing the thrust bearing is provided with second grooves corresponding to the first grooves on a one-to-one basis, wherein an accommodating space is formed by each first groove and a corresponding second groove, wherein a barrier is provided in each accommodating space, wherein an axial clearance and a radial clearance are formed between an inner surface of each accommodating space and an outer surface of the barrier accommodated in the accommodating space, and wherein the axial clearance and the radial clearance are in communication with the gap.

18. The lubricating mechanism of claim 17, wherein the barrier has a coefficient of thermal expansion greater than a coefficient of thermal expansion of the sliding bearing or than a coefficient of thermal expansion of the planetary gear.

19. The lubricating mechanism of claim 17, wherein in the radial direction, a shortest distance between two adjacent accommodating spaces close to the sliding bearing is greater than a shortest distance between two adjacent accommodating spaces away from the sliding bearing.

20. The lubricating mechanism of claim 17, wherein the barrier is closer to the sliding bearing than the seal in the radial direction.

* * * * *